United States Patent
Trebbi et al.

(10) Patent No.: US 11,047,727 B2
(45) Date of Patent: Jun. 29, 2021

(54) DEVICE AND METHOD FOR MOVING CONTAINERS TO A WEIGHING STATION FOR WEIGHING

(71) Applicant: I.M.A. INDUSTRIA MACCHINE AUTOMATICHE S.P.A., Ozzano dell'Emilia (IT)

(72) Inventors: Claudio Trebbi, Medicina (IT); Gabriele Gabusi, Castenaso (IT); Michele Cussini, Ozzano dell'Emilia (IT)

(73) Assignee: I.M.A. INDUSTRIA MACCHINE AUTOMATICHE S.P.A., Ozzano dell'Emilia (IT)

( * ) Notice: Subject to any disclaimer, the term of this patent is extended or adjusted under 35 U.S.C. 154(b) by 182 days.

(21) Appl. No.: 16/321,447

(22) PCT Filed: Jul. 28, 2017

(86) PCT No.: PCT/EP2017/069142
§ 371 (c)(1),
(2) Date: Jan. 28, 2019

(87) PCT Pub. No.: WO2018/019985
PCT Pub. Date: Feb. 1, 2018

(65) Prior Publication Data
US 2019/0178700 A1 Jun. 13, 2019

(30) Foreign Application Priority Data

Jul. 29, 2016 (IT) .......................... 102016000079769
Jul. 29, 2016 (IT) .......................... 102016000079799

(51) Int. Cl.
*G01G 15/00* (2006.01)
*G01G 17/00* (2006.01)
*B65G 47/90* (2006.01)

(52) U.S. Cl.
CPC .............. *G01G 17/00* (2013.01); *B65G 47/90* (2013.01); *G01G 15/00* (2013.01); *B65G 2201/0235* (2013.01)

(58) Field of Classification Search
CPC ........ G01G 17/00; G01G 15/00; B65G 47/90; B65G 2201/0235
(Continued)

(56) References Cited

U.S. PATENT DOCUMENTS 5,064,009 A * 11/1991 Melcher ................. G01N 5/045
177/245
5,115,876 A * 5/1992 Chang .................... G01G 15/00
177/145

(Continued)

FOREIGN PATENT DOCUMENTS

EP 2949353 A2 12/2015

OTHER PUBLICATIONS

International Search Report and Written Opinion for PCT/EP2017/069142, dated Nov. 23, 2017.

*Primary Examiner* — Randy W Gibson
(74) *Attorney, Agent, or Firm* — Marshall, Gerstein & Borun LLP

(57) ABSTRACT

A method for weighing containers arranged inside a holding structure includes providing a holding structure suitable to house in a substantially stable position at least one container, said at least one container including a supporting portion shaped so as to keep the container suspended on the holding structure, bringing said at least one container to a weighing station including a weighing member suitable to weight said at least one container, weighing said at container by means of said weighing member; wherein the weighing step is carried out by moving the holding structure so as to put said at least one container housed inside the holding structure in contact with the weighing member kept in a stationary (Continued)

position, until the detachment of the supporting portion of said at least one container from the holding structure is obtained.

14 Claims, 3 Drawing Sheets

(58) Field of Classification Search
USPC .......................................................... 177/145
See application file for complete search history.

(56) References Cited

U.S. PATENT DOCUMENTS

| | | | | |
|---|---|---|---|---|
| 5,193,630 | A | * | 3/1993 | Cane ..................... G01G 15/00 177/145 |
| 7,172,729 | B2 | * | 2/2007 | Las Navas Garcia ....................... G01G 19/00 422/78 |

\* cited by examiner

DEVICE AND METHOD FOR MOVING CONTAINERS TO A WEIGHING STATION FOR WEIGHING

TECHNICAL FIELD

The present invention relates generally to the sector of filling containers as vials, little bottles, syringes, carpules and alike in the pharmaceutical sector.

In particular, the invention relates to a method for weighing containers both empty and filled with a substance and a relative weighing unit by which such method is implemented.

BACKGROUND ART

It is frequent in the pharmaceutical sector the requirement to fill containers as vials, little bottles, syringes, carpules and alike with drugs according to a predefined dosage.

In such a case it is fundamental that the drug quantity contained in the container, for example ready-for-use syringe, is exactly the indicated one, with an extremely low error tolerance.

The prior art of the sector provides to prepare a nest inside which empty containers to be filled are housed, a robot extracts from the nest the containers one by one and carries out their single weighing in order to obtain their correct weight.

Usually the tare, the weight of the empty container, is firstly obtained, before the filling.

Once the containers brought back in the nest are filled, after obtaining the tare, the robot proceeds and extracts from the nest one container at a time in order to weight each one of them on a specific scale, usually using load cell, to obtain the weight of the container with its content (gross weight).

In order to speed the weighing of containers, both empty and already filled with the desired substance, the robot can extract from the nest simultaneously more containers at a time and place them back, after weighing, in the nest wherefrom they had been taken out.

Though advantageous, the above described method has some drawbacks among which a processing time of the weighing steps that, despite having become shorter thanks to more recent systems, does not allow high speeds due to the need of always extracting containers from the nest in order to carry out the measurement of the weight.

Such extraction from the nest, as above described, will have to be performed twice for each container when it is necessary to obtain the tare of each container and the gross weight of each container with the relative content.

EP-A-2949353 discloses a vertical displacement device which comprises a plurality of push rods which are arranged in correspondence to a regular arrangement of corresponding vials in a holding structure. The push rods drive up vertically from the bottom. A weight sensor may also be integrated at the upper end of the vertical displacement.

In other words, the weight sensor is vertically driven against the vial to weight it.

This movement of the weight sensor implies a loss of precision of the obtainable weight. Furthermore, in order to obtain a stable weight measure, it is necessary to wait for a longer time so that the vibrations of the weight sensor due to the vertical movement are suppressed.

Not least, it is necessary to provide systems of movement of the weight sensor that are precise and relatively small, with consequent increase of costs to produce them.

SUMMARY OF THE INVENTION

One first objective of the present invention is to make available one method for weighing containers housed in a nest that enables to dramatically reduce the processing time of the weighing of containers, without being detrimental for the precision of the measured values, in order to ensure the compliance with the standards required by the reference sector.

One second objective of the present invention is to make available a weighing unit enabling to implement the aforesaid method through a simple and rational constructive solution.

The first objective is reached by a method for weighing containers arranged in a holding structure according to claim 1 of the present invention.

The second objective is reached by a weighing unit for containers arranged in a holding structure according to claim 8.

Further characteristics and advantages will be more apparent from the hereinafter description of a preferred non-limiting embodiment of the present invention, with reference to the exemplary but non-limiting enclosed figures.

DETAILED DESCRIPTION

Figure 1:
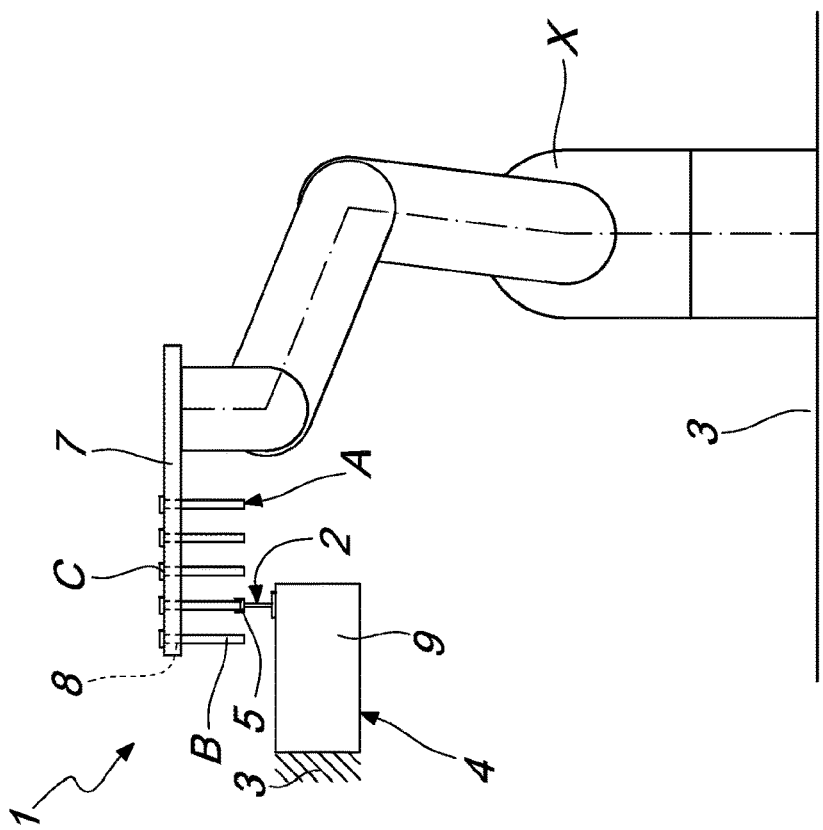
FIGS. 1-3 schematically show the weighing steps according to one first embodiment of the present invention, carried out with a weighing unit according to one first embodiment of the present invention.

Referring in particular to such Figures, 1 indicates globally a weighing unit for containers A housed in a holding structure 7, typically a nest.

The unit 1 is intended in particular for weighing containers A, of the type preferably selected among vials, little bottles, syringes, carpules and alike.

It must be pointed out that the types of mentioned containers are usually used in the pharmaceutical sector, and it is for this reason envisaged a very precise weighing thereof.

In fact, unit 1 according to the invention is usually coupled to a filling machine, which is in charge of performing the filling of container A with a predefined dose of at least one substance, before proceeding with the weighing of the filled containers, to obtain the gross weight.

Possibly, the weighing is also performed before the filling, in order to obtain the empty container weight datum (tare).

Containers A are housed inside the nest 7 in one substantially stable position.

In particular, each container A includes a supporting portion C shaped so as to abut against the nest 7 for keeping the containers A hanging from the nest.

In particular, the supporting portion C has an annual shape, typically as an annular shoulder portion at the top of the container A.

In the figures, the nest 7 comprises a flat surface with a plurality of cylindrical seats 8 configured to house the containers A.

When the containers A are housed into the cylindrical seat 8, the supporting portions C of the containers abut against the flat surface of the nest 7.

The cylindrical seat 8 are configured as openings (circular holes) within which the containers A are inserted.

In practise, the containers A are kept suspended with respect to the nest 7, from which they protrude through the openings 8, holding on the annular shoulder portion C.

Moreover, each aperture 8 has a central axis coinciding with a longitudinal axes of the container A housed within it.

According to the present invention, the unit 1 includes a weighing station including a weighing member 4, typically a load cell, onto which containers A are weighted.

This load cell 4 is kept in a stationary position during the weighing to ensure a correct and quick weighing.

The weighing of the container A is carried out by moving the nest 7 towards the load cell 4 in such a manner so as to bring the container A to be weighed into contact with the load cell 4. The container A lifts from the nest 7 causing the detachment of the annular shoulder portion C of the container A from the nest 7.

In the present invention, the detachment of the annular shoulder portion C of the container A is obtained only by the movement of the nest 7 with respect to the stationary load cell 4.

The weighing of containers A can occur by means of a manipulator, preferably an anthropomorphic robot X, which is duly programmed to move the nest 7 in such a way as to bring one of the containers A into contact with the load cell 4 until the detachment of shoulder C from the nest 7 is obtained.

Thereby the weight of the container is obtained without extracting it from the nest and bringing it on a weighing member.

In fact, according to the present invention, the weighing process, simply occurs by moving the nest 7, within which the containers to be weighted are held, without extracting the containers to be weighted.

As said before, according to the present invention, the weighing member 4 is kept in a stationary position.

In other words, it is the nest with the containers that is taken to the load cell 4 while the latter stay stably fixed.

Thereby, an extremely precise weighing is obtained, as the weighing member is not subjected to stresses that the containers movement would cause.

As an alternative to the robot, it is possible to use any other transport system as for example carriage on rails or belt carriage.

Figure 3:
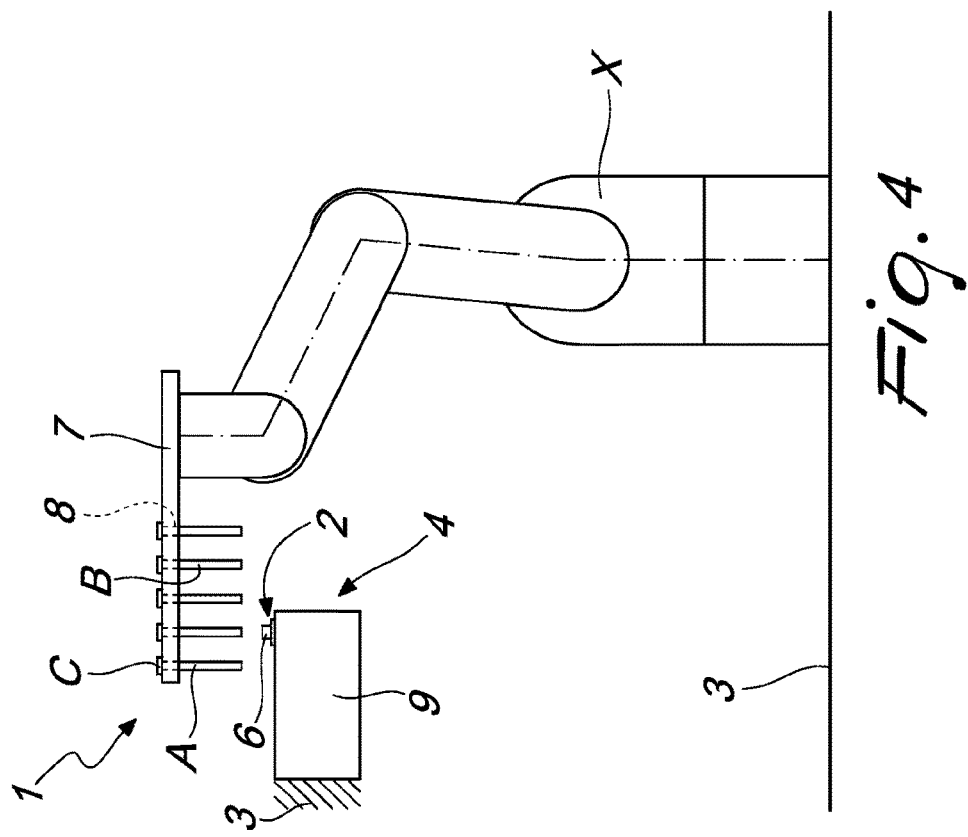

The container A which is weighted can therefore stay in its seat 8 in the nest 7 during the weighing step. However, it is possible that the container A can exit completely from its seat 8, as shown in FIG. 3, when the container A is laid on the load cell 4. In this last case, though the container A does not remain in its seat, no extraction operation is in any case is performed by any robot.

In order to obtain an optimal weighing, the container A must stay stable on the load cell 4, this is obtained by a proper supporting member 2 coupled to the load cell 4 and onto which the container A abuts.

Figure 2:
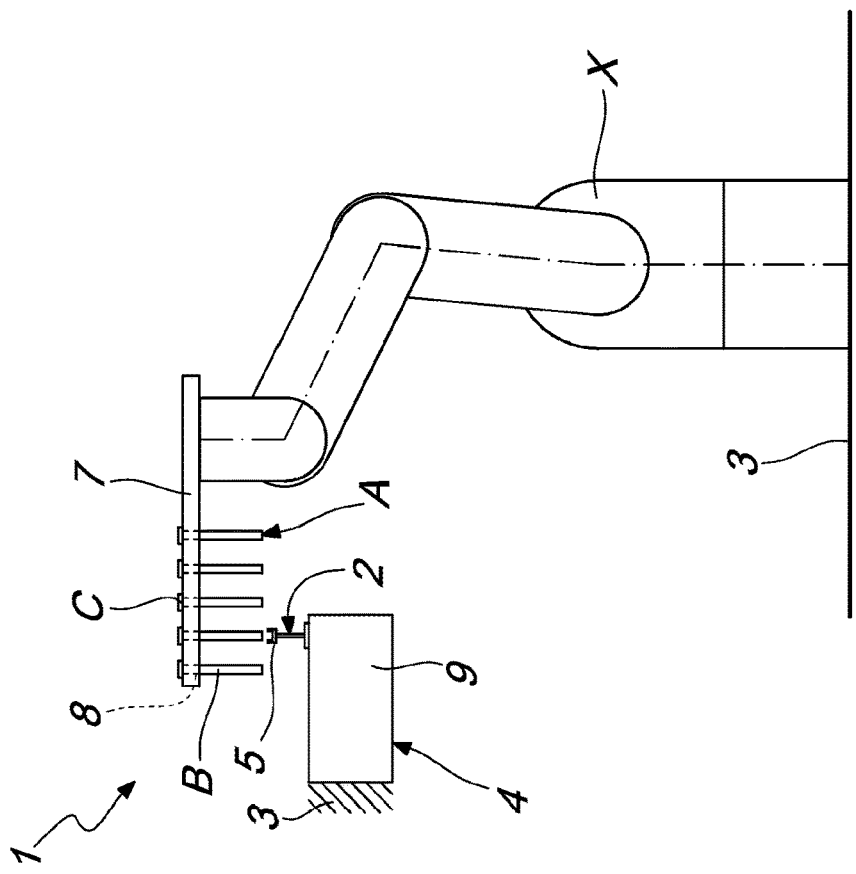

Shaped elements can be used as supporting member 2 to removably retain the container A, for example through a recess or a small cup 5 (FIG. 1-3) configured to accommodate the bottom B of the container A.

Figure 4:
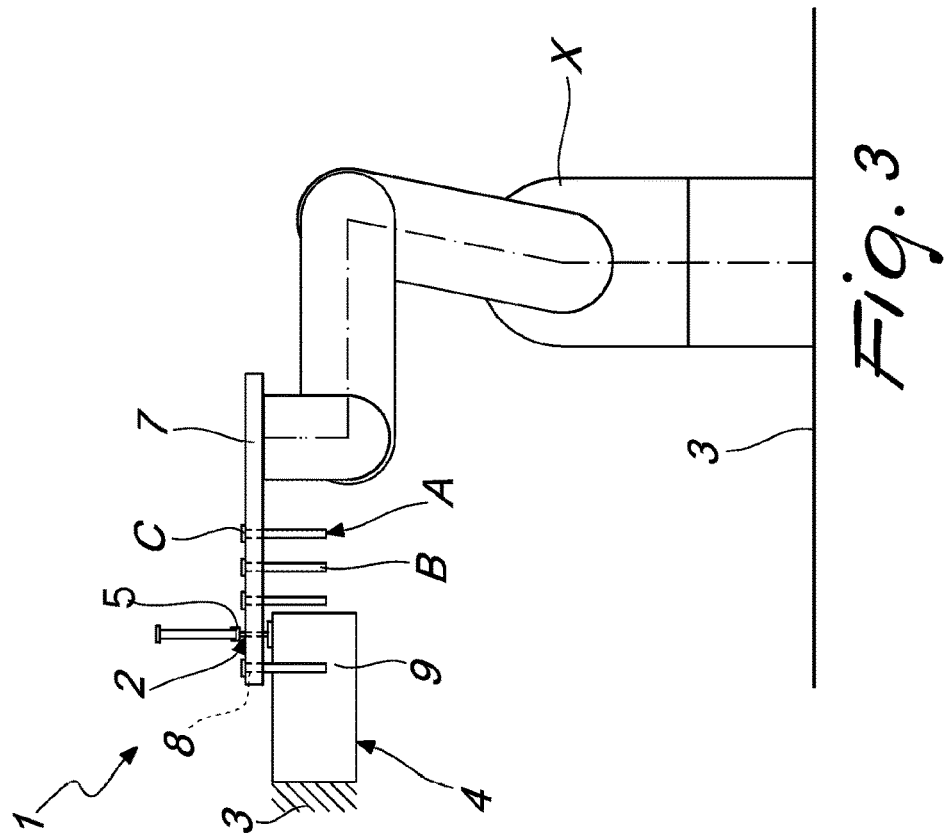
FIGS. 4-6 schematically show the weighing steps according to one second embodiment of the present invention, carried out with a weighing unit according to one second embodiment of the present invention.
Figure 6:
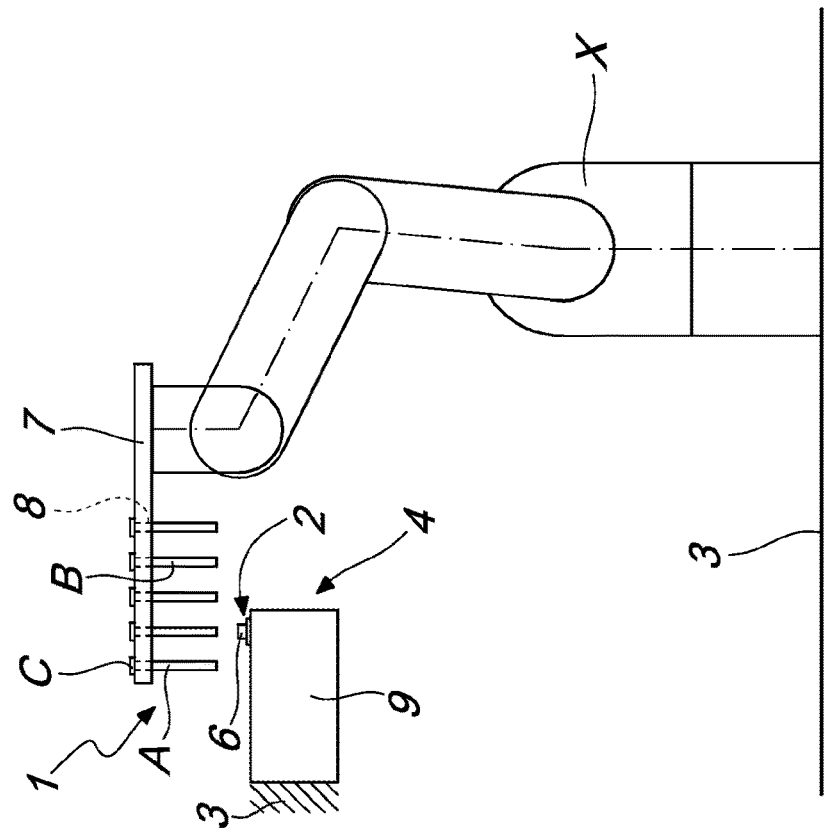
Figure 5:
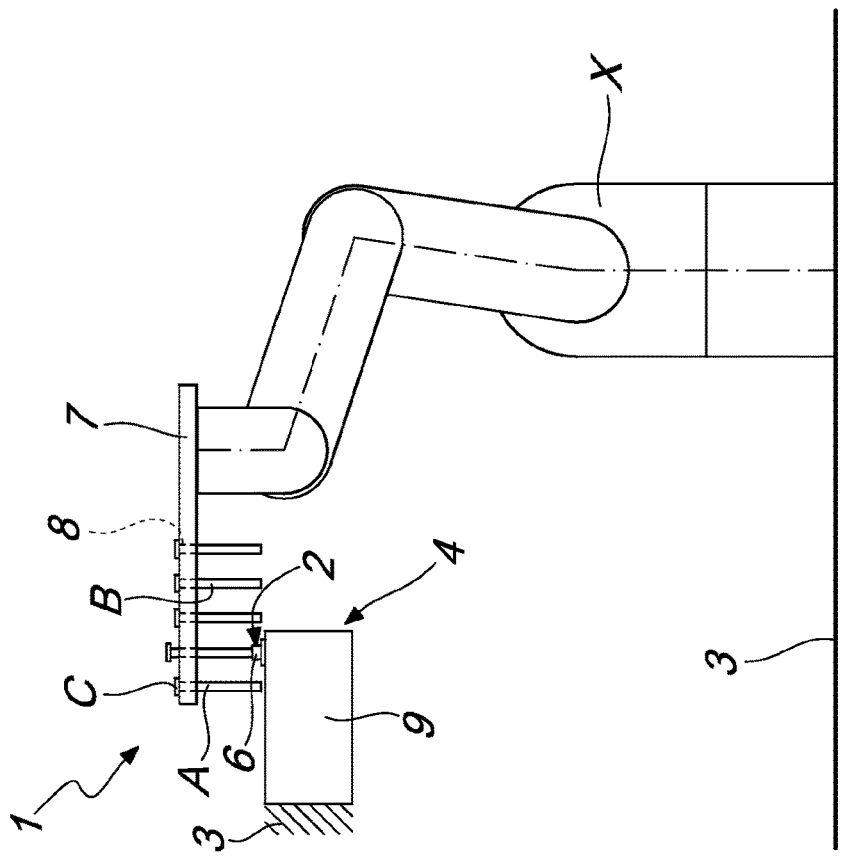

In alternative, the supporting member 2 may be constituted by one simple plane element 6 (FIG. 4-6).

The stability of the load cell 4 is increased by the fact that they can stably fixed to an adequate support 9.

Thereby precise and quick weighings are obtained with no need to provide movement members of the load cell.

This support 9 is in turn preferably fixed to a frame 3 of a chamber wherein weighing operations occur.

Operatively, the weighing of containers occurs according to the hereinafter described steps.

A nest 7 containing the containers A to be weighted, which can be empty or can contain a substance, is provided. As previously stated, it is sometimes necessary to weight each container before and after the filling.

Containers A will be laid inside the openings 8 through which they protrude downwardly being kept suspended on the nest 7 by means of the annular shoulder C, the latter embodies an annular ring obtained on the upper edge of the container A.

The weighing step is carried out by moving the nest 7 towards the load cell 4 in such a manner so as to bring the container 7 into contact with the load cell 4 while load cell 4 is kept in a stationary position. The container A lifts from the nest 7 detaching the annular shoulder C from the nest 7, the detachment of the annular shoulder C being obtained only by the movement of the nest 7 with respect to the stationary load cell 4.

According to a preferred embodiment, the robot X clamps the nest 7 containing at least one container (empty or containing a substance) and takes it near the stationary load cell 4. The nest 7 is handled in such a way as to put the container A to be weighted in contact with the load cell 4 and continues to move the nest 7 until the detachment of the annular ring C from the nest 7 is obtained, in order to measure the weight of the container.

As previously said, it is preferable that during the weighing the bottom B of the container A can be placed into the supporting member 2 to removably keep the container A in a stable position, when the annular ring C detaches from the nest 7.

In order to move the nest 7 holding the containers A in a quick way and not interfere at the same time with the weighing, the nest 7 is kept by the robot X through clamping means of the type known in the sector.

Preferably, the step when the robot X takes the nest 7 with the container A onto the load cell to obtain the weight is carried out positioning the container A, to be weighted, above the load cell 4 with a vertical lowering of the nest 7 until abutment of the bottom B of the container A on the load cell 2 or the supporting member 2 of the load cell 4. Proceeding with the downwardly and always vertically movement of the nest 7 moved by the robot X, the detachment of the annular ring C from the nest 7 is obtained with the consequent possibility to obtain the weight of the container.

Even if the seats 5 of the nest 7 have side walls onto which the containers (A) contact even during the measurement of the weight, it is irrelevant because this contact would not make unreliable the measurement.

In practice, if during the weighing, the container A touches the nest 7 (more precisely the seat 8 within which it is inserted), with its own side walls, it is irrelevant as far as the measurement to be performed is concerned.

In order to speed up the weighing step, the robot X can be controlled by a control unit programmed to operate the movements of the robot X according to an input received by the load cell 4.

Though explicit reference has been made to the weighing of a container (empty or containing a substance) at a time, it is possible to perform this weighing operation with more containers simultaneously.

Obviously, in order to fulfil contingent and specific needs, an expert in this sector might make several changes and variants to the above described invention, all of them included in the scope of protection of the invention as defined by the following claims.

The invention claimed is:

1. A method for weighing containers arranged in a holding structure comprising the steps of:
    providing a holding structure suitable to hold in a substantially stable position at least one container possibly containing a substance to be weighed, said at least one container including a supporting portion shaped so as to abut against the holding structure for keeping said at least one container hanging from the holding structure;
    providing a robotic manipulator, the manipulator arranged to clamps the holding structure;
    using the robotic manipulator to bring the holding structure and the at least one container to a weighing station having a weighing member suitable to weigh said at least one container;
    weighing said at least one container with said weighing member; wherein the weighing step is carried out by using the robotic manipulator to move the holding structure vertically towards said weighing member in such a manner so as to bring said at least one container housed inside the holding structure into contact with the weighing member while said weighing member is kept in a stationary position, said at least one container lifting from the holding structure causing the detachment of the supporting portion from said holding structure, the detachment of the supporting portion being obtained only by the movement of the holding structure with respect to the stationary weighing member.

2. The method according to claim 1, wherein during the weighing step, the holding structure is secured to the manipulator.

3. The method according to claim 1, wherein the movement of the holding structure towards said weighing member is carried out in a vertical direction in such a way so as that the lifting of the supporting portion of the container from the holding structure occurs along a substantially vertical direction.

4. The method according to claim 3, wherein said supporting portion of the container is lifted from the holding structure for a distance smaller that a longitudinal extension of the container, so that the container does not completely leave the holding structure.

5. The method according to claim 1, wherein a supporting member is coupled to the weighing member, the container going in abutment onto said supporting member during the weighing step.

6. The method according to claim 5, wherein during the weighing step, said at least one container is removably kept in a stable position by said supporting member.

7. The method according to claim 1, wherein the movement of the holding structure with respect to the weighing member kept in a stationary position is controlled by a control unit according to an input received by the weighing member.

8. A weighing unit of containers arranged in a holding structure, wherein at least one container is held by the holding structure, said at least one container including a supporting portion shaped so as to abut against the holding structure for keeping said at least one container hanging from the holding structure; said weighing unit comprising:
    a weighing station including a weighing member suitable to weigh said at least one container, said weighing member being fixed to a support so that the weighing member cannot move with respect to the support; a robotic manipulator programmed to move the holding structure in such a manner so as to bring said at least one container housed inside the holding structure into contact with the weighing member while said weighing member is kept in a stationary position, until the detachment of the supporting portion of said at least one container from the holding structure is obtained, wherein the manipulator is configured to clamp the holding structure and take it to the weighing station and to move the clamped holding structure towards said weighing member when weighing said at least one container.

9. The unit according to claim 8, wherein the weighing member includes a load cell.

10. The unit according to claim 8, wherein the weighing station includes a supporting member onto which the container abuts during the weighing of the container.

11. The unit according to claim 10, wherein the supporting member is configured to stably keep the container during the weighing.

12. The unit according to claim 8, wherein said manipulator is connected to a control unit programmed to control the movements of the manipulator according to an input received by the weighing member.

13. The unit according to claim 8, wherein said holding structure comprises a flat surface with at least a cylindrical seat configured to house said at least one container, the supporting portion having an annual shape and abutting against said flat surface of the holding structure when said at least one container is housed into said at least one cylindrical seat.

14. The unit according to claim 13, wherein said cylindrical seat comprises a circular hole with a central axis coinciding with a longitudinal axis of the container when housed within said seat.

* * * * *